Aug. 4, 1959     K. E. POLMANTEER     2,897,869
SILOXANE RUBBER TIRE

Filed Feb. 15, 1957

INVENTOR.
KEITH E. POLMANTEER
BY Robert F. Fleming Jr.

ATTORNEY

United States Patent Office 2,897,869
Patented Aug. 4, 1959

2,897,869
SILOXANE RUBBER TIRE

Keith E. Polmanteer, Midland, Mich., assignor to Dow Corning Corporation, Midland, Mich., a corporation of Michigan Application February 15, 1957, Serial No. 640,505

5 Claims. (Cl. 152—330)

This invention relates to a wire cord reinforced silicone rubber tire.

Ever since the advent of organosiloxane elastomers with their greatly improved resistance to weathering and to high temperature there have been attempts to prepare commercially feasible tires for automotive vehicles from this type of elastomer. Inasmuch as the primary advantage to be gained from employing siloxane rubbers is increased heat stability, it was necessary that such tires be fabricated employing heat resistant cords. This meant that the cords should be either of glass or metal.

The first attempts to prepare silicone rubber tires were directed toward the use of glass cords since the adhesion of silicone rubber to glass is generally much better than that to metal. However, in spite of many years of effort it was found that glass cords are not suitable due to the breakdown of the cord with flexing of the tire. Consequently even though it was possible to fabricate silicone rubber tires employing glass cords none of these tires have to date proved to be commercially feasible.

Prior attempts to fabricate silicone rubber tires employing metal cords have heretofore been stymied due to two factors. One is that there was no way of obtaining proper adhesion of the silicone rubber to the metal particularly to steel or brass coated steel which is normally employed in the fabrication of metal cord rubber tires. When the adhesion between the rubber and the reinforcing cord is poor, the tire tends to disintegrate upon use.

The second reason why it was impossible in the past to prepare useable silicone rubber-metal cord tires was the fact that the silicone rubber stocks (that is the unvulcanized rubber) heretofore employed in attempting to manufacture tires did not have the proper building tack needed for the fabrication of the tire. Consequently there were flaws in the tire. The term "building tack" refers to that combination of stickiness and cohesive strength which causes the various parts of the tire to bond together during fabrication. The term "cohesive strength" refers to the internal strength in the unvulcanized rubber.

Figure 2:
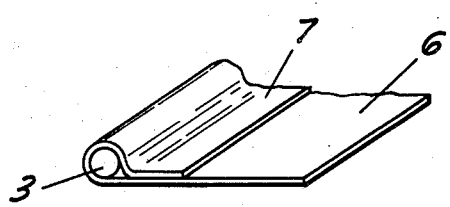

Proper building tack is particularly important when metal cords are employed as the reinforcing fabric. Since the metal cords are rather stiff, they offer quite a bit of resistance to being bent and consequently the bent fabric has a tendency to unfurl. Thus, when a silicone rubber coated wire fabric (i.e. a ply) is bent around the bead of the tire as shown in Figure 2 and the silicone rubber stock does not have the proper building tack, either the ply will separate at the surface of the next ply or the ply will simply pull in two due to the lack of cohesive strength of the rubber portion thereof. Consequently great difficulty is encountered in laying up the tire carcass and in holding it together between the time that it is laid up and the time the rubber is vulcanized. Even if the tire does hold together almost inevitably the vulcanized tire will be inoperative due to flaws caused by lack of cohesive strength of the silicone rubber.

Applicant has found that silicone rubber tires having the structure hereinafter described can be made satisfactorily and do have the required strength to be useful on automotive vehicles.

It is the object of this invention to provide superior heat resistant, weather resistant silicone rubber tires for automotive vehicles which can be used under conditions where no other previously known rubber tire will operate satisfactorily.

This invention relates to a tire for wheeled vehicles comprising silicone rubber reinforced with metal cords, said silicone rubber consisting essentially of (1) a polysiloxane of at least 1,000,000 cs. viscosity, in which the organic radicals on the silicon are monovalent hydrocarbon radicals or halogenated monovalent hydrocarbon radicals and in which there is an average from 1.99 to 2 inclusive of said radicals per silicon, (2) from 1 to 10 parts per 100 parts of (1) of an aliphatic hydrocarbon silicate in which the aliphatic hydrocarbon radicals contain less than 10 carbon atoms, and (3) a silica filler having a surface area of at least 100 square meters per gram, in which silica the surface thereof is saturated with organosilyl groups of the formula $R'_nSi$, which groups are bonded to the silica by SiOSi linkages and in which $R'$ is a monovalent hydrocarbon radical or halogenated monovalent hydrocarbon radical of less than 7 carbon atoms and $n$ has an average value from 2 to 3 inclusive.

Figure 1:
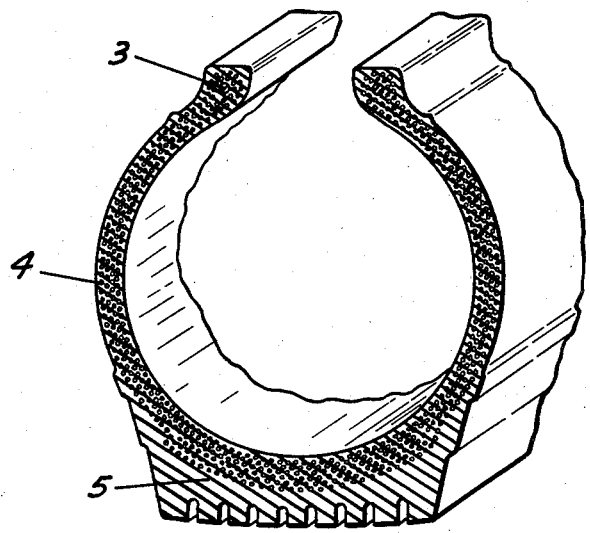

Tires made in accordance with this invention can be prepared in the conventional manner for making tires and can be cured in the conventional manner for curing organosiloxane rubbers. In order that the invention may be better understood, recourse can be had to the accompanying drawings in which Figure 1 shows a cross section of a typical tire made in accordance with this invention and Figure 2 is a section of a ply-bead assembly.

The tires of this invention may be prepared by calendering the defined silicone rubber stock 5 onto suitable wire cords 4. The plys so prepared are then laid up in the conventional manner and procured around bead 3. Preferably the wire of the bead is first coated by extruding a thin layer of silicone rubber 5 on the surface thereof. A tread of silicone rubber 5 is then adhered to the carcass, the whole assembly is placed into a mold and molded under suitable conditions. When peroxides are the vulcanizing agent, the tire is preferably molded under pressure at 125 to 150° C. The resulting tire is then best cured at temperatures from 200 to 250° C. for sufficient time, preferably from 10 to 24 hours, to develop the maximum strength of the silicone rubber.

The particularly desirable feature of the tires of this invention is the fact that that portion of the ply which is bent around the bead forms a secure bond. This is illustrated in Figure 2 which shows an individual ply 6 bent around bead 3. At the junction between the lap 7 and the ply 6 a firm bond is formed so that the lap 7 does not separate during subsequent processing, vulcanization and use.

Any suitable metallic cord can be employed in the tires of this invention. Generally steel cords are preferred and, if desired, these may be coated with copper or brass or other suitable metals in order to lessen corrosion of the steel and/or to increase adhesion of the silicone rubber. The wire beads can be made of the same materials as the cords.

Any organopolysiloxane having a viscosity of at least 1,000,000 cs. at 25° C. in which the organic substituents on the silicon are any monovalent hydrocarbon radical or any halogenated monovalent hydrocarbon radical can be employed in the tires of this invention.

Specific examples of polysiloxanes which are operative herein are dimethylpolysiloxane, phenylmethylpolysiloxane, vinylmethylpolysiloxane, octadecylmethylpolysiloxane, xenylmethylpolysiloxane, diethylpolysiloxane, ethylmethylpolysiloxane, tolylmethylpolysiloxane, diphenylpolysiloxane, cyclohexylmethylpolysiloxane, chlorophenylmethylpolysiloxane, chloromethylmethylpolysiloxane, α,α,α-trifluorotolylmethylpolysiloxanes, trifluoropropylmethylpolysiloxane, bis-trifluoropropylsiloxane, and copolymers of such siloxanes. If desired, siloxanes may also contain some triorganosilyl units such as trimethylsiloxane, vinyldimethylsiloxane and the like. Preferably the siloxanes of this invention are dimethylsiloxanes or trifluoropropylmethylsiloxanes or copolymers of these siloxanes with vinylmethylsiloxane, phenylmethylsiloxane and diphenylsiloxane.

Any aliphatic silicate in which the aliphatic hydrocarbon groups contain less than 10 carbon atoms can be employed as an additive in the compositions of this invention. The term "aliphatic silicate" as used herein includes both orthosilicates (i.e. $(RO)_4Si$) and partial hydrolyzates thereof. Specific examples of operative silicates are tetramethylsilicate, tetraisopropylsilicate, tetrabutylsilicate, tetra-2-ethylhexylsilicate, tetraallylsilicate, diethyldiisopropylsilicate and partial hydrolyzates of such silicates in which some of the silicon atoms are linked through SiOSi linkages. The silicate can be a mixture of two or more of any combination of the above silicates. Both the orthosilicates and partial hydrolyzates thereof are well-known commercial materials.

The particular fillers which are operative in this invention are silica fillers of a finely divided nature which have a surface area of at least 100 square meters per gram, the surface of which is saturated with the defined organosilyl groups. Such fillers can be prepared by any suitable method. One suitable method is to prepare a finely divided silica such as one may obtain by burning a volatile silane and thereafter treat the silica with a reactive organosilicon compound such as a chlorosilane or a silazane. Under these conditions the organosilicon compound reacts with the surface of the silica to form organosilyl groups thereon.

A second method is that of reacting a silica hydrogel or organogel with a reactive organosilicon compound. In general, this method entails precipitating silica from an alkali metal silicate solution to form a silica hydrogel and thereafter treating the gel with a reactive organosilicon compound such as a chlorosilane, an alkoxysilane or a siloxane. When a siloxane is employed treatment should be carried out under acidic conditions which insure complete reaction of the organosilicon compound with the silica.

The organosilyl groups which are attached to the silicas of this invention can be any group of the formula $R'_nSi\equiv$ in which $R'$ is any monovalent hydrocarbon radical or halogenated monovalent hydrocarbon radical of less than 7 carbon atoms such as methyl, ethyl, propyl, butyl, hexyl, vinyl, allyl, phenyl, pentafluoroethyl, chlorophenyl, 3,3,3-trifluoropropyl, chloromethyl and trifluorovinyl. For the purpose of this invention there can be an average of from two to three $R'$ groups on the silicon of the organosilyl group. Thus, the silica can be saturated with diorganosilyl groups, triorganosilyl groups or mixtures of such groups with or without limited amounts of monoorganosilyl groups. For example, the surface of the silica may be saturated with dimethylsilyl or trimethylsilyl groups or a combination thereof, or a combination of trimethylsilyl and monomethylsilyl groups.

In preparing the silicone rubber stocks prior to application to the wire cords it is only necessary to mix the ingredients together in any suitable fashion until a uniform mix is obtained.

The tires of this invention can be vulcanized by any of the known methods for curing organosiloxane rubbers. These include, for example, vulcanization with organic peroxides, with alkyl silicates in the presence of metal salts of carboxylic acids, with high energy radiation or with sulfur. The preferred commercial method is the use of organic peroxides such as benzoyl peroxide, tertiary-butyl perbenzoate, dicumyl peroxide and 2,4-dichlorobenzoyl peroxide.

In addition to the essential ingredients 1, 2 and 3, the rubber employed in this invention may contain other additives such as pigments, compression set additives, oxidation inhibitors, plasticizers, stabilizers and other materials normally employed with silicone rubber.

The following examples are illustrative only and should not be construed as limiting the invention which is properly delineated in the appended claims.

The following abbreviations are employed in the examples: Me for methyl, Ph for phenyl, Et for ethyl and Vi for vinyl.

*Example 1*

The silicone rubber stock employed to produce the tire described below had the following composition in parts by weight:

100 parts of a copolymer gum composed of 92.36 mol percent dimethylsilozane, 7.5 mol percent phenylmethylsiloxane and .14 mol percent methylvinylsiloxane, 60 parts of a trimethylsilyl treated silica having a surface area of at least 100 square meters per gram, which was prepared by treating an acid silica hydrogel with isopropanol and hexamethyldisiloxane until the water in the gel was replaced by hexamethyldisiloxane and thereafter separating the water and removing the hexamethyldisiloxane and alcohol from the gel, 3 parts ethylpolysilicate, and .5 part benzoyl peroxide.

These ingredients were milled until a uniform mix was obtained.

The tire plys were made by calendering the above silicone rubber stock onto parallel wire cords. Each cord was .028 inch in diameter and was formed of twisted steel wires. The coated fabric was 35 mils thick. The tire fabric was cut into sections 24½ inches long and 7 pieces were laid side by side to make 1 ply. The ply was wrapped around a drum which had been coated with a polyethylene slip sheet. The ply was wrapped around the drum at an angle such that the wires would form an angle of 58° with the center line of the drum. A second ply was placed over the first so that the wires would run in the opposite direction.

The bead bundles were composed of strands of copper coated steel wire in which each strand had a diameter of .043 inch. The two beads were coated with the above silicone rubber stock and then put in place on the laid up plys. Some of the silicone rubber stock was applied to the inside of the bead bundle as an apex material. The ends of the tire fabric were then turned over the bead bundles and stitched down. There was excellent adhesion of the stitched down portion of the ply to the remainder thereof and there was no separation of the fabric during further processing.

The tire tread made of the above silicone rubber stock was then applied and the tire carcass was removed from the drum, dusted well with diatomaceous earth on the inside and molded in a conventional mold on the following schedule.

Inside tire:
    30 minutes at 365° F.
    20 minutes at 190° F.
Outside tire mold:
    3 minutes wait
    30 minutes at 427° F.
    42 minutes at 190° F.

The resulting tire was then removed from the mold and cured in an oven 20 hours at 300° F., 4 hours as the temperature was raised from 300 to 400° F. and 24 hours at 400° F. The resulting tire was in excellent condition and was operated successfully on a station wagon.

Example 2

The silicone rubber of this example was composed of the following compositions in parts by weight:

100 parts of the polymer of Example 1,
40 parts of a silica aerogel which had been treated with trimethylchlorosilane until the surface was saturated with trimethylsilyl groups,
3 parts ethylpolysilicate, and
.5 part benzoyl peroxide.

The resulting silicone rubber stock had the required cohesive strength and building tack to be suitable for building a tire. It also had the required adhesion to wire as shown by the following tests.

Copper coated steel bead wire was imbedded in a slab of the stock having the following dimensions: .1 x 1 x ¼ inch so that the wires ran parallel to the 1 inch surface. The slab was then cured 5 minutes at 250° F. followed by 2 hours at 400° F. The wires were then pulled from the slab and it was found that it required a force of 49.5 pounds. By contrast, an identical silicone rubber stock except that it contained no ethylpolysilicate was prepared and molded with the imbedded wires. It required only 13 pounds to remove the wires from the slabs. This shows that the stock did not have sufficient adhesion to be useful for a rubber tire.

Example 3

A silicone rubber stock suitable for producing tires is obtained from the following formulation:

100 parts of the polymer of Example 1,
60 parts of the filler of Example 1,
3 parts of n-propylorthosilicate, and
.5 part benzoyl peroxide.

When copper coated steel wires were imbedded in this material as described in Example 2, it required 82.5 pounds to pull them from the slab. This test together with the cohesive strength of the stock showed that the material of this example is suitable for fabrication of tires.

Example 4

Equivalent results are obtained when a 3,3,3-trifluoropropylmethylpolysiloxane gum is employed in the procedure of Example 1.

Example 5

Equivalent results are obtained when a fume silica having a surface area greater than 100 square meters per gram, prepared by burning silicon tetrachloride, is treated with the following chlorosilanes so that its surface is saturated with the following organosilyl groups, is substituted in the procedure of Example 1. All percentages are mol percents.

| Chlorosilane | Organosilyl group on surface of silica |
|---|---|
| $Me_2SiCl$ | $Me_2Si=$ |
| $PhMe_2SiCl$ | $PhMe_2Si-$ |
| 5% $Me_2ViSiCl$ 95% $Me_3SiCl$ | 5% $Me_2ViSi-$ 95% $Me_3Si-$ |
| 5% $MeSiCl_3$ 20% $Me_2SiCl_2$ 75% $Me_3SiCl$ | 5% $MeSi\equiv$ 20% $Me_2Si=$ 75% $Me_3Si-$ |
| $CF_3CH_2CH_2SiCl$ | $CF_3CH_2CH_2Si-$ |
| $Et_3SiCl$ | $Et_3Si-$ |

Example 6

Equivalent results are obtained when tetra-2-ethylhexyl silicate is substituted in the procedure of Example 1.

That which is claimed is:

1. A tire for wheeled vehicles comprising silicone rubber reinforced with metal cords, said silicone rubber consisting essentially of (1) a polysiloxane of at least 1,000,000 cs. viscosity at 25° C. in which siloxane the organic radicals are selected from the group consisting of monovalent hydrocarbon radicals and halogenated monovalent hydrocarbon radicals, there being on the average from 1.99 to 2 inclusive of said organic radicals per silicon atom, (2) from 1 to 10 parts by weight per 100 parts by weight of (1) of an aliphatic hydrocarbon silicate in which the aliphatic hydrocarbon radicals contain less than 10 carbon atoms, and (3) a silica filler having a surface area of at least 100 square meters per gram, the surface of which silica is saturated with organosilyl groups of the formula $R'_nSi$, which groups are bonded to the silica by SiOSi linkages and in which $R'$ is selected from the group consisting of monovalent hydrocarbon radicals and halogenated monovalent hydrocarbon radicals, of less than 7 carbon atoms, and $n$ has an average value from 2 to 3 inclusive.

2. A tire for wheeled vehicles comprising silicone rubber reinforced with metal cords, said silicone rubber consisting essentially of (1) a methylpolysiloxane of at least 1,000,000 cs. viscosity at 25° C. having on the average from 1.99 to 2 inclusive methyl groups per silicon atom, (2) from 1 to 10 parts by weight per 100 parts by weight of (1) of an ethylsilicate and (3) a silica filler having a surface area of at least 100 square meters per gram, the surface thereof being saturated with methylsilyl groups having an average of from 2 to 3 inclusive methyl groups per silicon.

3. A tire in accordance with claim 2 wherein the methylsilyl groups are trimethylsilyl groups.

4. A tire for wheeled vehicles comprising silicone rubber reinforced with metal cords, said silicone rubber consisting essentially of (1) a methylphenylvinylpolysiloxane having a viscosity of at least 1,000,000 cs. at 25° C. and having an average of from 1.99 to 2 inclusive of the defined organic radicals per silicon atom, (2) from 1 to 10 parts by weight per 100 parts by weight of (1) of an ethylsilicate and (3) a silica filler having a surface area of at least 100 square meters per gram, the surface thereof being saturated with methylsilyl groups having from 2 to 3 inclusive methyl radicals per silicon atom.

5. A tire in accordance with claim 4 wherein the methylsilyl groups are trimethylsilyl groups.

References Cited in the file of this patent

UNITED STATES PATENTS

| 2,610,167 | Te Grotenhuis | Sept. 9, 1952 |
| 2,744,878 | Smith-Johannsen | May 8, 1956 |
| 2,795,262 | Frank | June 11, 1957 |

FOREIGN PATENTS

| 178,606 | Great Britain | Apr. 27, 1922 |